May 2, 1967     G. H. HICKMAN     3,316,756
VIBRATION MONITORING SYSTEM
Filed June 12, 1964
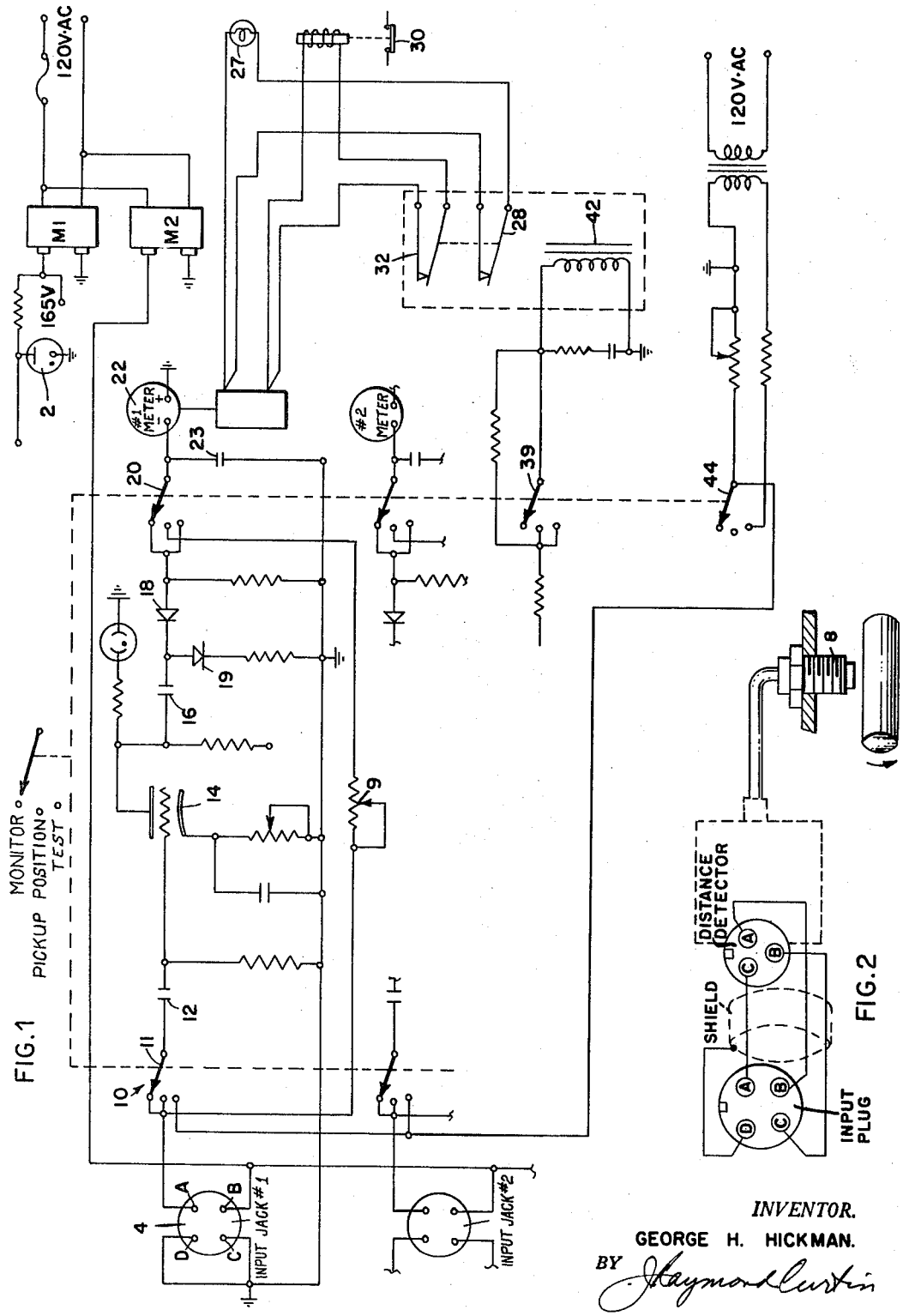
INVENTOR.
GEORGE H. HICKMAN.
BY Raymond Curtin
ATTORNEY.

United States Patent Office 3,316,756
Patented May 2, 1967

3,316,756
VIBRATION MONITORING SYSTEM
George H. Hickman, Jeannette, Pa., assignor to Carrier Corporation, Syracuse, N.Y., a corporation of Delaware
Filed June 12, 1964, Ser. No. 374,681
3 Claims. (Cl. 73—71.4)

The invention relates broadly to vibration detection and measurement apparatus. More particularly, this invention relates to an improved read out arrangement for a vibration detection system enabling effective vibration monitoring to be accomplished.

In detecting the vibration of certain structural units, as for illustration a rotary shaft supporting a load such as a machine component, equipment is provided for detecting the vibration of the shaft by a variation in voltage signal from a pickup or sensing device, employed as part of a detection system, arranged adjacent the shaft. In equipment of the kind described, the pickup is mounted adjacent a shaft subject to vibration. With the shaft at rest, the pickup operates to transmit a reference signal having a particular voltage characteristic. As the shaft rotates and vibration is encountered, the voltage characteristic varies in accordance with the amplitude of the vibration. The term amplitude of vibration in this instance means the distance, from a point representing the center line of the shaft at rest, the shaft moves under the influence of forces created by vibration. The invention is concerned with mechanism for receiving the signal from the pickup device and translating it through appropriate circuitry to a linear measurement representing the amplitude of vibration. The invention is further concerned with mechanism for monitoring the shaft vibration to the extent that an alarm system is coupled to the vibration measurement device and operates to communicate vibration of an undesirable magnitude and/or to interrupt the movement of the shaft by termination of the operation of the shaft prime mover.

The chief object of this invention is the provision of an improved vibration measurement device in which a signal transmitted by a vibration detection system is recorded in terms of linear measurement of the amplitude of vibration.

An additional object of the invention is the provision of a vibration detection and measurement system of the type described in which means are provided for determining the position of the pickup device prior to initiation of the vibration detection and measurement operation.

A further object of the invention is the provision of mechanism of the kind described wherein means are incorporated for the purpose of testing the operation of the pickup device prior to initiation of the vibration detection and measurement system operation.

Other objects and features of the invention will be apparent upon a consideration of the ensuing specification and drawing in which:

FIGURE 1 is a schematic representation of a circuit illustrating the invention; and FIGURE 2 is a diagrammatic view of a structural part such as a machine power shaft and a vibration detector of a known type, the parts being shown to more clearly describe the manner in which vibration signals are detected and transmitted to the circuit shown in FIGURE 1.

Devices for detecting the vibration of a rotary shaft by determining variation from a predetermined signal emitted by a pickup device placed adjacent the shaft are known. Heretofore devices for vibration detection have been employed to transmit an electric signal to a read out device such as an oscilloscope, permitting an observer to determine by continual inspection of an oscilloscope the degree of vibration detected by the device.

In equipment such as gas compressors where a prime mover is connected to a rotary shaft mounting a plurality of impellers for compressing gas, it is important to know the exact amount of vibration to which the shaft is subjected under all operating conditions preferably without the service of an attendant such as would be necessary with an oscilloscope. For example, under certain circumstances, a shaft vibration resulting in shaft displacement on the order of 5–6 mils may be within an acceptable limit for safety, while a shaft vibration resulting in shaft displacement in excess of 12 mils would be an unsafe condition as far as the possibility of destruction of the machine through excessive vibratory forces is concerned.

With an oscilloscope as a read out device it is impossible to determine with any degree of accuracy the specific magnitude of vibration without an operator in attendance. Accordingly, it is the primary object of this invention to provide a device which will enable one to accurately determine the actual extent of vibration in terms of shaft movement that a particular rotational machine of the kind described is subjected. To this end, the mechanism to be hereinafter described contains a feature which includes first, the issuance of a warning concerning the amplitude of shaft movement, and second, an actual trip signal at which time the machine operation will terminate.

The particular mechanism for detecting vibration of a shaft does not form a part of this invention which is directed to the accurate measurement of vibration as detected by a mechanism emitting an electric signal representative of the presence of vibration. Vibration detection mechanism may be commercially obtained from the Bentley Nevada Corporation, an organization that markets a vibration detection system known as a model D–152. In the interest of clarity, however, a brief description of the vibration detecting system of the kind with which the measuring and monitoring system forming this invention has been successfully applied follows. The vibration detection system includes a sensing head placed about 25–30 mils from a shaft subject to vibration, an energizer and a detector. By means of a small oscillator in the detector a 3–4 megacycle signal is fed to the sensing head. Vibration of the shaft varies the reactance of the head, modulating the signal in accordance with the change in reactance. This resultant signal is fed to a diode-detector which removes the R.F. component and presents the low frequency component as an output. It is this latter signal that is presented to the mechanism forming this invention.

The terminal of the described vibration sensing mechanism which serves to transmit the signal is connected to the input terminals A, D on a panel, not shown, mounting the vibration measurement measuring and monitoring system serving as the subject of this invention. With the shaft at rest the signal is a D.C. voltage of 8 volts. Connected to terminal A of the input jack is a three-position control switch 10 having upper, intermediate and lower operating contacts and an actuator shown in dotted lines on the drawing. When the switch 10 is in the upper position as illustrated in the drawing, the system serving as the subject of this invention is operable to monitor or to continuously measure the vibration of a shaft with which the Bentley sensing head is associated.

Referring to the electrical diagram a source of alternating current (120 v.) is connected to power supply units M1 and M2. The output of power supply M1 is a 165 volt input to the vibration detection and measuring system. A voltage regulator 2 maintains the voltage at 150 volts regardless of any changes due to normal apparatus demand fluctuation. The output of M2 is fed as an input to the vibration detection system through terminals B, C on the input jack 4. The output of the vibration system described above is then fed via terminals A, D on jack 4 to the measurement and monitoring circuit through the upper terminals of arms 11 and 20 of control switch 10. As indicated above, the signal detected at terminals A, D is a low frequency D.C. voltage signal on the order of 8 volts when the shaft is at rest. Vibration of the shaft varies the signal to the extent that an A.C. component is impressed on the reference D.C. voltage. Condenser 12 filters the D.C. component so that only the A.C. component is presented to the amplifier shown as a triode vacuum tube 14. The amplified A.C. component is fed to a condenser 16 where any D.C. component that may have been impressed on the signal is removed. From the condenser the signal is transmitted via rectifier 18 and blocking diode 19 to a measuring meter 22. Condenser 23 is employed to stabilize the action of the pointer mechanically coupled to a coil in the meter and movable over a scale having indicia representing linear shaft movement in terms of thousandths of an inch or mils. The signal presented to the metering device 22 flows through a coil having a mechanical connection to a pointer.

As indicated above there is provided an alarm or warning system associated with the measuring meter 22. To this end, alarm and trip circuits are arranged responsive to relays actuated by adjustable pre-set limits of shaft movement. For illustration, a first or alarm circuit includes an indicating lamp 27 in series with relay 28. When the pointer measuring the amplitude of vibration reaches an adjustable predetermined value, the coil controlling relay 28 is energized completing a circuit causing illumination of lamp 27. If desired, an audible signal could be substituted for lamp 27. Completion of the circuit described warns an operator that the shaft displacement, a direct function of the magnitude of vibration, has increased so as to approach an unsafe level.

As an absolute safety feature there is provided a second or trip circuit including a normally closed switch 30 disposed in the control circuit of the machine employing the shaft having its vibration monitored. In series with switch 30 is a relay 32, the coil of which is energized when the pointer indicates a predetermined increase in shaft displacement over that employed to complete the circuit through lamp 27. Completion of the circuit controlled by relay 32 opens switch 30 and terminates operation of the machine.

An additional feature of the invention involves an arrangement for positioning the pickup or sensing head of the vibration detection system. For this purpose the control switch 10 is moved to a second operating position so that arms 11 and 20 engage the intermediate contacts shown on the circuit diagram and a circuit is completed through adjustable resistor 9. This circuit directly connects the meter 22 with the input jack 4 so that only the D.C. signal representative of the distance the sensing head 8 is located from the shaft is passed to the meter. With the control switch 10 positioned as described, pickup sensing head is moved to or from the shaft by appropriate adjusting mechanism until the pointer reaches a predetermined position on the scale. This, in effect, is a neutral position from where the signal pointer will move under the influence of shaft vibration as described above.

In connection with this feature of the invention there is provided means for temporarily isolating the relays 28 and 32 so that the alarm and trip circuits will not be accidentally energized while the pickup positioning circuit is energized. To this end, switch 39 is mechanically coupled to the actuator for switch 10 and completes a circuit when switch 10 is moved to the position where the intermediate contacts are engaged. As illustrated on the circuit diagram, switch 39 completes a circuit through coil 42 which "locks out" the relays 28 and 32 rendering them inoperative should the signal pointer be manually moved beyond the alarm and trip values on the scale of meter 22. The coil 42 includes a time delay feature that continues to "lock out" the relays for a short period after the switch 39 is opened.

A third feature of the invention involves an arrangement for testing the vibration measuring equipment to determine if it is operating properly. The test is accomplished by feeding a signal representing a magnitude of vibration indicating shaft displacement of two mils. As long as the measuring meter records the signal as indicating two mils shaft displacement the equipment is functioning properly. To realize this feature the control switch actuator is moved so that arms 11 and 20 engage the lower set of contacts on the control switch 10. This movement also completes a circuit controlled by switch 44, mechanically coupled to the actuator for the control switch. A circuit is then energized which impresses an A.C. signal comparable to an output from the detection system indicating shaft displacement of two mils on the monitoring circuit. The measuring meter is then observed to determine if it is recording such a signal.

While the invention has been described as it pertains to the monitoring of a single point of vibration on a shaft, it will be understood that a number of points on a shaft may be subject to the detection and measurement equipment in order that a relative comparison of the vibration throughout the part may be obtained.

While I have described a preferred embodiment of the invention, it will be understood the invention is not limited thereto since it may be otherwise embodied within the scope of the following claims.

I claim:
1. In combination with mechanism for detecting vibration of a structural part wherein said vibration is sensed by a variation in an electrical signal caused by movement of the structure under the influence of vibration relative to a signal transmission device, a first circuit including a control switch having a first set of contacts for transmitting the detected signal to a measuring device to record the shaft displacement due to vibration, a second circuit including a second set of switch contacts for indicating the position of the vibration sensing device relative to said part, and a third circuit including a third set of contacts for transmitting independently of said vibration sensing device a signal indicative of a pre-selected magnitude of vibration to test the accuracy of said measuring device.

2. The combination set forth in claim 1 wherein additional circuit means are provided to detect shaft displacement in excess of a predetermined magnitude and to indicate said displacement.

3. The combination set forth in claim 2 wherein means are provided, responsive to the engagement of the control switch with the second set of contacts, to render inoperative said additional circuit means.

References Cited by the Examiner

UNITED STATES PATENTS

| | | | |
|---|---|---|---|
| 2,796,756 | 6/1957 | Yates et al. | 73—71.4 X |
| 2,799,015 | 7/1957 | Bell | 73—71.4 X |
| 3,201,776 | 8/1965 | Morrow et al. | 73—71.4 |

FOREIGN PATENTS

| | | |
|---|---|---|
| 127,015 | 3/1948 | Australia. |

RICHARD C. QUEISSER, *Primary Examiner.*

C. A. RUEHL, *Assistant Examiner.*